(12) United States Patent
Nishiyama et al.

(10) Patent No.: US 11,567,509 B2
(45) Date of Patent: Jan. 31, 2023

(54) CONTROL SYSTEM, CONTROL METHOD, AND NON-TRANSITORY STORAGE MEDIUM

(71) Applicant: NEC Corporation, Tokyo (JP)

(72) Inventors: Tetsuo Nishiyama, Tokyo (JP); Hideki Tanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 690 days.

(21) Appl. No.: 16/478,983

(22) PCT Filed: Oct. 17, 2017

(86) PCT No.: PCT/JP2017/037472
§ 371 (c)(1),
(2) Date: Jul. 18, 2019

(87) PCT Pub. No.: WO2018/138980
PCT Pub. Date: Aug. 2, 2018

(65) Prior Publication Data
US 2019/0369636 A1  Dec. 5, 2019

(30) Foreign Application Priority Data

Jan. 30, 2017 (JP) .............................. JP2017-014503

(51) Int. Cl.
*G05D 1/02* (2020.01)
*G05D 1/00* (2006.01)
(Continued)

(52) U.S. Cl.
CPC ......... *G05D 1/0246* (2013.01); *G05D 1/0088* (2013.01); *G06V 10/751* (2022.01);
(Continued)

(58) Field of Classification Search
None
See application file for complete search history.

(56) References Cited

U.S. PATENT DOCUMENTS 9,682,622 B2 *  6/2017  Kim .................... B60K 28/066

FOREIGN PATENT DOCUMENTS

JP   2014-102750 A   6/2014
JP   2015-102893 A   6/2015
(Continued)

OTHER PUBLICATIONS

Japanese Office Action for JP Application No. 2018-564110 dated Jan. 11, 2022 with English Translation.
(Continued)

*Primary Examiner* — Abdhesh K Jha

(57) ABSTRACT

According the present invention, there is provided a control system (10) that includes an image acquisition unit (11) that acquires an image generated by a camera, a controlled object determination unit (12) that analyzes the image and determines at least one of a vehicle that satisfies a predetermined
(Continued)

condition and a vehicle in which a predetermined person is riding included in the image, as a vehicle to be controlled, a control content decision unit (13) that decides a control content for the vehicle to be controlled, and an output unit (14) that outputs a control command including the control content to the vehicle to be controlled.

19 Claims, 9 Drawing Sheets

(51) Int. Cl.
*G06V 10/75* (2022.01)
*G06V 20/54* (2022.01)
*G06V 20/59* (2022.01)
*G06V 40/20* (2022.01)
*G06V 40/10* (2022.01)
*G08G 1/04* (2006.01)

(52) U.S. Cl.
CPC .............. *G06V 20/54* (2022.01); *G06V 20/59* (2022.01); *G06V 40/103* (2022.01); *G06V 40/20* (2022.01); *G08G 1/04* (2013.01); *G05D 2201/0213* (2013.01); *G06V 2201/08* (2022.01)

(56) References Cited

FOREIGN PATENT DOCUMENTS

| | | | | |
|---|---|---|---|---|
| JP | 2015-133050 A | | 7/2015 | |
| JP | 2015133050 A | * | 7/2015 | |
| JP | 2015-228152 A | | 12/2015 | |
| JP | 2016-006603 A | | 1/2016 | |
| JP | 2016-006605 A | | 1/2016 | |
| JP | 2016-186813 A | | 10/2016 | |
| JP | 2016186813 A | * | 10/2016 | ........... B60R 25/102 |
| JP | 2016-192079 A | | 11/2016 | |
| JP | 2016192079 A | * | 11/2016 | |
| JP | 2016-205971 A | | 12/2016 | |
| JP | 2016205971 A | * | 12/2016 | ............. G01C 21/34 |
| WO | WO-2016/170785 A1 | | 10/2016 | |

OTHER PUBLICATIONS

International Search Report corresponding to PCT/JP2017/037472 dated Jan. 23, 2018 (7 pages).

* cited by examiner

FIG. 4

| FEATURE VALUE OF VEHICLE | CONTROL CONTENT |
|---|---|
| ⋮ | ⋮ |

FIG. 6

| FEATURE VALUE OF PERSON | CONTROL CONTENT |
|---|---|
| ⋮ | ⋮ |

FIG. 7

| BEHAVIOR PATTERN OF VEHICLE | CONTROL CONTENT |
|---|---|
| ⋮ | ⋮ |

FIG. 8

| BEHAVIOR PATTERN OF PERSON | CONTROL CONTENT |
|---|---|
| ⋮ | ⋮ |

FIG. 9

| STATE OF PERSON | CONTROL CONTENT |
|---|---|
| ⋮ | ⋮ |

CONTROL SYSTEM, CONTROL METHOD, AND NON-TRANSITORY STORAGE MEDIUM

CROSS REFERENCE-TO RELATED APPLICATIONS

This application is a national stage application of International Application No. PCT/JP2017/037472 entitled "Control System, Control Method, and Program" filed on Oct. 17, 2017, which claims priority to Japanese Patent Application No. 2017-014503 filed on Jan. 30, 2017, the disclosures of which are hereby incorporated by reference in their entirety.

TECHNICAL FIELD

The present invention relates to a control system, a control method, and a program.

BACKGROUND ART

In Patent Document 1, a system for controlling a vehicle having an autonomous driving function is disclosed. The system includes a main-line-side-vehicle recognition apparatus that recognizes the vehicle traveling on a main line of a road, a branch-line-side-vehicle recognition apparatus that recognizes the vehicle traveling on a branch line of the road, a merge support apparatus that supports merging, and an in-vehicle apparatus to be mounted on the vehicle. The merge support apparatus distributes a merging priority and traveling speed information at the time of merging to the vehicle in association with a vehicle number. The in-vehicle apparatus performs a travel control of the own vehicle according to the received merging priority and traveling speed information at the time of merging.

RELATED DOCUMENT

Patent Document

[Patent Document 1] Japanese Patent Application Publication No. 2015-102893

SUMMARY OF THE INVENTION

Technical Problem

The technology disclosed in Patent Document 1 controls the vehicle entering a merging point. Therefore, there is a problem in that the control cannot be performed on the basis of information associated with the vehicle or a person riding in the vehicle.

Solution to Problem

According to the present invention, there is provided a control system that includes an image acquisition unit that acquires an image generated by a camera, a controlled object determination unit that analyzes the image and determines at least one of a vehicle that satisfies a predetermined condition and a vehicle in which a predetermined person is riding included in the image, as a vehicle to be controlled, a control content decision unit that decides a control content for the vehicle to be controlled, and an output unit that outputs a control command including the control content to the vehicle to be controlled.

In addition, according to the present invention, there is provided a control method executed by a computer, the method including an image acquisition step of acquiring an image generated by a camera, a controlled object determination step of analyzing the image and determining at least one of a vehicle that satisfies a predetermined condition and a vehicle in which a predetermined person is riding included in the image, as a vehicle to be controlled, a control content decision step of deciding a control content for the vehicle to be controlled, and an output step of outputting a control command including the control content to the vehicle to be controlled, the steps being executed by a computer.

According to the present invention, there is provided a program causing a computer to function as an image acquisition unit that acquires an image generated by a camera, a controlled object determination unit that analyzes the image and determines at least one of a vehicle that satisfies a predetermined condition and a vehicle in which a predetermined person is riding included in the image, as a vehicle to be controlled, a control content decision unit that decides a control content for the vehicle to be controlled, and an output unit that outputs a control command including the control content to the vehicle to be controlled.

Advantageous Effects of Invention

According to the present invention, it is possible to perform the control on the basis of information associated with a vehicle having an autonomous driving function or a person riding in the vehicle.

BRIEF DESCRIPTION OF THE DRAWINGS

The above-described object and other objects foregoing and other object, characteristics, and advantages will become apparent from the following descriptions of preferred example embodiments and the accompanying drawings.

FIG. 4 is a diagram schematically illustrating an example of information used in processing performed by the control system in the present example embodiment.

FIG. 6 is a diagram schematically illustrating an example of information used in the processing performed by the control system in the present example embodiment.

FIG. 7 is a diagram schematically illustrating an example of information used in the processing performed by the control system in the present example embodiment.

FIG. 8 is a diagram schematically illustrating an example of information used in the processing performed by the control system in the present example embodiment.

FIG. 9 is a diagram schematically illustrating an example of information used in the processing performed by the control system in the present example embodiment.

DESCRIPTION OF EMBODIMENTS

First Example Embodiment

Figure 1:
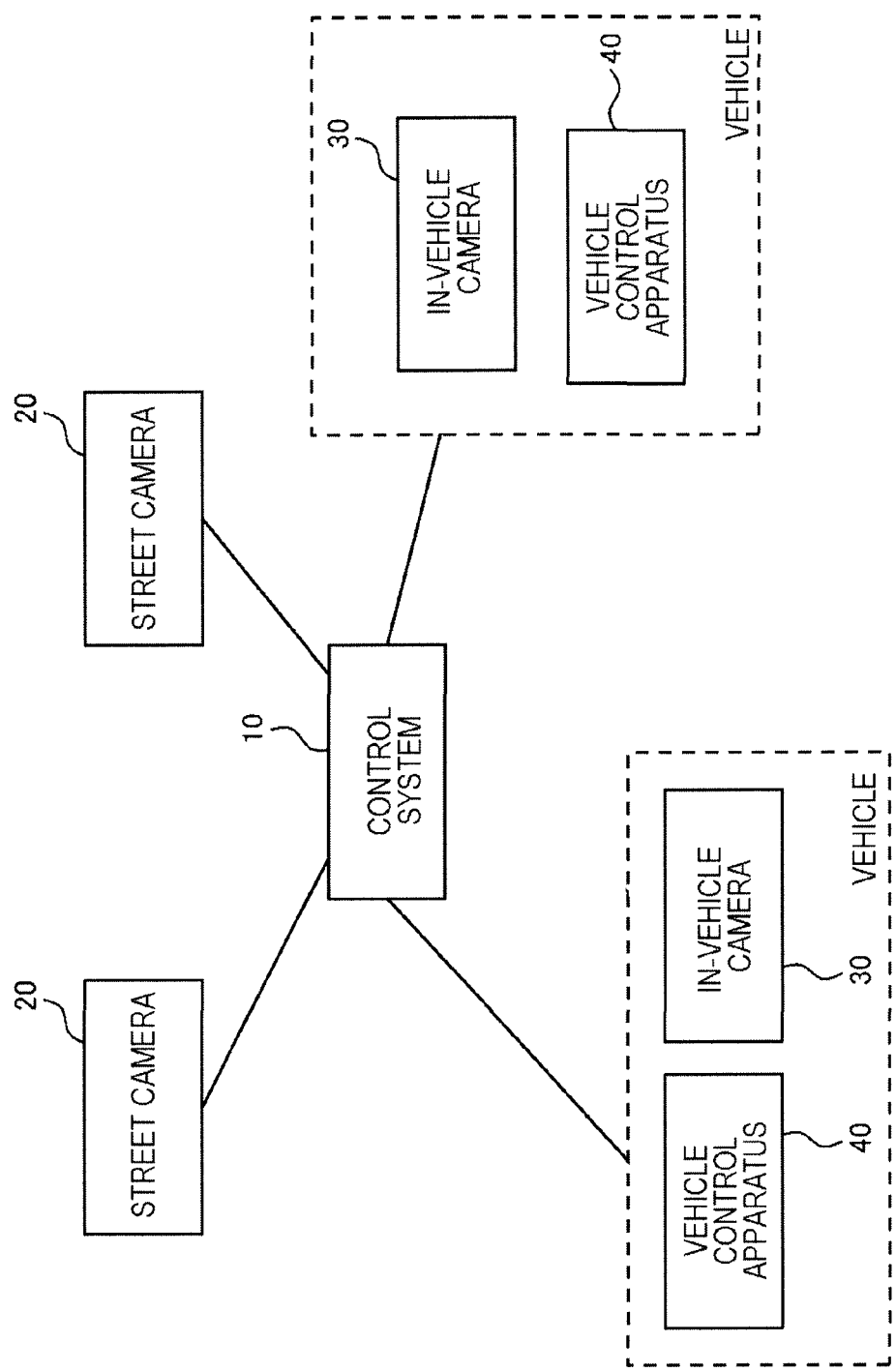
FIG. 1 is an example of a functional block diagram illustrating an overview of a traffic system in the present example embodiment.

An overview of a traffic system in the present example embodiment will be described with reference to FIG. 1. A control system 10 is, for example, a cloud server, and controls a vehicle having an autonomous driving function from the outside. A street camera 20 is installed on a road and images the road on which the vehicle travels. An in-vehicle camera 30 is installed in the vehicle and images at least one of the outside of the vehicle and the inside of the vehicle. A plurality of cameras (for example, a camera for imaging the outside of the vehicle and a camera for imaging the inside of the vehicle) may be installed in one vehicle. The vehicle control apparatus 40 is installed in the vehicle and controls the operation (for example, steering, braking, and acceleration) of the own vehicle. That is, the vehicle has an autonomous driving function. The vehicle control apparatus 40 is, for example, an electronic control unit (ECU).

The control system 10 and a plurality of street cameras 20 can transmit and receive information to and from each other by any communication means. For example, the control system 10 and the plurality of street cameras 20 may communicate with each other through a communication network such as the Internet.

In addition, the control system 10 and the systems (including the in-vehicle camera 30 and the vehicle control apparatus 40) of each of a plurality of vehicles can transmit and receive information to and from each other by any communication means. For example, if the system of the vehicle is connected to the Internet through a communication terminal such as a mobile phone or a smartphone, the control system 10 and the systems of each of the plurality of vehicles may communicate through a communication network such as the Internet.

In this case, after connecting to the Internet through a communication terminal, the system of each vehicle may transmit information (for example, a vehicle number) identifying the own vehicle to any server. Correspondence information in which information for identifying each vehicle and address information on the communication terminal on the Internet are associated with each other may be registered in ay server. In this way, the control system 10 can transmit predetermined information (for example, a control command described below) to the system of a predetermined vehicle using the correspondence information.

In addition, the control system 10 and the systems of each of the plurality of vehicles may communicate using a road-to-vehicle communication. For example, the system of the vehicle may transmit the information to a nearby road side apparatus by the road-to-vehicle communication, and a road side apparatus may transmit the information to the control system 10 by any communication means (for example, communication through a communication network such as the Internet). In this case, the system of the vehicle may transmit the information in association with the information for identifying the own vehicle (for example, the vehicle number).

In addition, the control system 10 may transmit information to the road side apparatus near a vehicle to which the information (for example, a control command described below) is to be transmitted, by any communication means (for example, communication through a communication network such as the Internet), and then, the road side apparatus may transmit the information to the vehicle by the road-to-vehicle communication. In this case, the control system 10 may transmit the information in association with information (for example, the vehicle number) for identifying the vehicle to which the information is to be transmitted. The road side apparatus may simultaneously transmit information with which the information for identifying the vehicle (for example, the vehicle number) is associated, to the vehicles in the vicinity of the road side apparatus itself. The system of the vehicle that received the information may acquire the information if the information for identifying the vehicle associated with the information (for example, the vehicle number) indicates the own vehicle, and if not, may discard the information. The unit that determines a position of the vehicle to which the information is to be transmitted will be described below. Installation position of each road side apparatus may be registered in advance.

In addition, the control system 10 and the systems of each of the plurality of vehicles may communicate using a vehicle-to-vehicle communication. For example, the system of the vehicle transmits the information to the nearby systems of other vehicles by the vehicle-to-vehicle communication, and then, the systems of other vehicles may transmit the information to the control system 10 by any communication means (for example, the communication through a communication network such as the Internet). In this case, the system of the vehicle may transmit the information in association with the information for identifying the own vehicle (for example, the vehicle number).

In addition, the control system 10 may transmit information (for example, a control command described below) by any communication means (for example, communication through a communication network such as the Internet) to the systems of other vehicles near the vehicle to which the information is to be transmitted, and then, the systems of the other vehicles may transmit the information to the system of the vehicle by the vehicle-to-vehicle communication. In this case, the control system 10 may transmit the information in association with information (for example, the vehicle number) for identifying the vehicle to which the information is to be transmitted. The systems of the other vehicles may simultaneously transmit the information with which the information for identifying the vehicle (for example, the vehicle number) is associated, to vehicles in the vicinity of the own vehicle. When the information identifying the vehicle (for example, the vehicle number), which is associated with the information, indicates the own vehicle, the system of the vehicle that received the information acquires that information, and if not, that vehicle information may be discarded. The unit that determines the position of the vehicle to which the information is to be transmitted will be described below. The positions of other vehicles may be acquired from the system of other vehicles itself by any communication means.

The control system 10 acquires images generated by the cameras such as the in-vehicle camera 30 and the street camera 20, for example.

The control system 10 analyzes the acquired image and determines the vehicle that satisfies a predetermined condition included in the image as a vehicle to be controlled. For example, the control system 10 determines a vehicle in the image which matches an appearance feature value, a vehicle number, and the like of a vehicle which are pre-registered, as the vehicle to be controlled. That is, when finding the pre-registered vehicle on the basis of the image acquired from the street camera 20 and the in-vehicle camera 30, the control system 10 sets the vehicle as an object to be controlled. The appearance feature value or the vehicle number of the vehicle such as a stolen vehicle, a vehicle of a suspect, a missing person's vehicle, or the like may be registered in advance.

Thereafter, the control system 10 decides a control content for the determined vehicle to be controlled. For example, the control system 10 determines a destination and determines a route to the destination. The control system 10 may decide a police station as the destination, and may decide a safe route with less pedestrian traffic.

Thereafter, the control system 10 outputs a control command including the decided control content, to the vehicle to be controlled. The vehicle control apparatus 40 of each vehicle controls the own vehicle according to the control command.

Next, a configuration of the control system 10 will be described. First, an example of a hardware configuration of the control system 10 will be described. Each functional unit included in the control system 10 in the present example embodiment is realized by any combination of hardware and software focusing on a central processing unit (CPU) of any computer, a memory, a program loaded in the memory, a storage unit such as a hard disk for storing the program (or a program downloaded from a storage medium such as a compact disc (CD) or a server on the Internet can be stored in addition to the program stored from the stage of shipping the apparatus), and the interface for network connection. Those skilled in the art will understand that there are various modifications for the realization method and the apparatus thereof.

Figure 2:
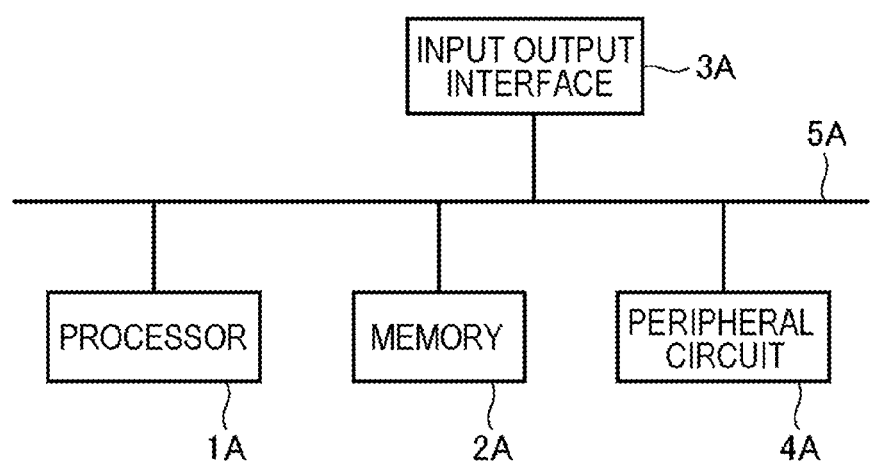
FIG. 2 is a diagram conceptually illustrating an example of a hardware configuration of a control system in the present example embodiment.

FIG. 2 is a block diagram illustrating an example of a hardware configuration of the control system 10 in the present example embodiment. As illustrated in FIG. 2, the control system 10 includes a processor 1A, a memory 2A, an input output interface 3A, a peripheral circuit 4A, and a bus 5A. The peripheral circuit 4A includes various modules.

The bus 5A is a data transmission path for the processor 1A, the memory 2A, the peripheral circuit 4A, and the input output interface 3A to mutually transmit and receive data. The processor 1A is an arithmetic processing device such as a central processing unit (CPU) or graphics processing unit (GPU), for example. The memory 2A is a memory such as a random access memory (RAM) or a read only memory (ROM), for example. The input output interface 3A includes an interface for acquiring information from an input device (for example, a keyboard, a mouse, a microphone, a physical key, a touch panel display, a code reader, and the like), and an interface for outputting the information to an output device (for example, a display, a speaker, a printer, a emailer, and the like), an external device, an external server, an external sensor, and the like. The processor 1A can issue commands to each module and perform calculations on the basis of the result of calculation.

Figure 3:
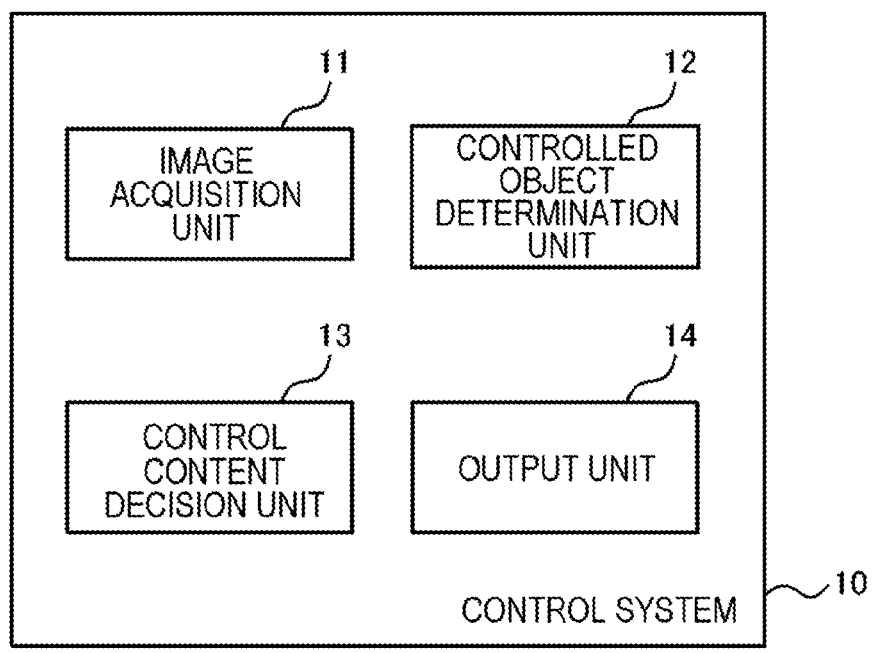
FIG. 3 is an example of a functional block diagram of the control system in the present example embodiment.

Next, the functional configuration of the control system 10 will be described. FIG. 3 illustrates an example of a functional block diagram of the control system 10. As illustrated, the control system 10 includes an image acquisition unit 11, a controlled object determination unit 12, a control content decision unit 13, and an output unit 14.

The image acquisition unit 11 acquires an image generated by the camera. For example, the image acquisition unit 11 acquires the image from at least one of the in-vehicle camera 30 installed in the vehicle and the street camera 20 installed on the road. The image acquisition unit 11 can collect the images from a plurality of in-vehicle cameras 30 and a plurality of street cameras 20.

The in-vehicle camera 30 may be a camera for imaging inside of the vehicle, a camera for imaging the outside of the vehicle, or both. The camera for imaging inside of the vehicle is installed so as to image a face of a person riding in the vehicle. The camera for imaging the outside of the vehicle is installed so as to image another vehicle on the road or a person in another vehicle. The street camera 20 is installed so as to image a vehicle positioned on the road or a person riding in the vehicle.

The street camera 20 and the in-vehicle camera 30 may generate a still image at a predetermined timing or continuously generate a moving image. The street camera 20 and the in-vehicle camera 30 may transmit all the generated images to the control system 10, or may transmit a predetermined image to the control system 10 when a predetermined condition is satisfied. In either case, it is preferable that the street camera 20 and the in-vehicle camera 30 transmit the generated image data to the control system 10 with the time loss as small as possible from the image generation timing.

The controlled object determination unit 12 analyzes the image acquired by the image acquisition unit 11 and determines the vehicle that satisfies a predetermined condition included in the image as the vehicle to be controlled. Specifically, the controlled object determination unit 12 determines the vehicle in the image which matches at least one of the feature value of the appearance and the vehicle number of a vehicle which is pre-registered (for example, shape and color of the predetermined potion), as the vehicle to be controlled. Details of the image analysis are design matter. The image is an image generated by the in-vehicle camera 30 for imaging the inside of the vehicle, the in-vehicle camera 30 for imaging the outside of the vehicle, the street camera 20 and the like.

The control content decision unit 13 decides the control content for the vehicle to be controlled determined by the controlled object determination unit 12.

Figure 4:
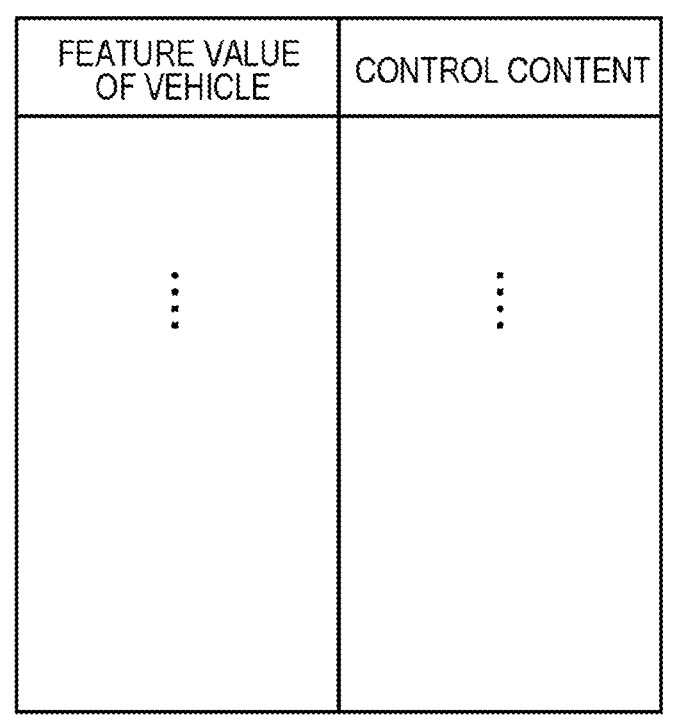

For example, as illustrated in FIG. 4, at least one of the appearance feature value of the vehicle and the vehicle number may be registered in association with the control content in advance. The control content decision unit 13 may decide the control content associated with at least one of the appearance feature value of the vehicle and the vehicle number as the control content of the vehicle to be controlled.

For example, the destination may be registered in association with a predetermined vehicle. The control content decision unit 13 may decide the destination associated with the vehicle as the control content of the vehicle to be controlled. The registered destination may be specific one destination such as "00 police station", or may be a destination that can be selected according to the current position of the vehicle to be controlled such as a "nearest police station" or "the nearest police station among the xx, ∆∆, and yy".

Means that determine the current position of the vehicle to be controlled are not particularly limited. For example, the control system 10 may communicate with the vehicle to be controlled by any means and may acquire information indicating the current position from the vehicle to be controlled. In addition, the control system 10 may estimate the current position of the vehicle to be controlled on the basis of at least one of a background included in the image used to determine the vehicle to be controlled, an installation position of the street camera 20 that generated the image, and the current position of the in-vehicle camera 30 that generated the image at the time of generating the image. In this case, the control system 10 may acquire an image from the in-vehicle camera 30 and may further acquire the current position at the time of generating each image. In addition, each installation position of a plurality of street cameras 20 may be registered in advance, and the control system 10 may be configured such that the information can be used.

In addition, selection criteria for a route to the destination may be determined in association with the predetermined vehicle. As examples of the selection criteria, "a shortest route", "use a highway preferentially", "use a road having a less pedestrian traffic preferentially", and the like can be considered, but not limited thereto. The control content decision unit 13 may decide a route to the destination that matches the selection criteria of the route associated with the vehicle, as the control content of the vehicle to be controlled. The control content decision unit 13 decides a route to the destination on the basis of the current position of the vehicle to be controlled, the destination, the selection criteria for the route, the map information, and the like. In the map information, information indicating a volume of pedestrian traffic may be registered in association with each road.

In addition, the control content may be decided as causing the vehicle to stop in association with the predetermined vehicle. In this case, the control content decision unit 13 may decide to cause the vehicle to stop as the control content of the vehicle to be controlled. The control content may be decided as causing the vehicle to stop in association with the predetermined vehicle under a certain condition. For example, when the current position of the vehicle to be controlled is a general road, the control content may be decided as causing the vehicle to stop, and when a highway, the control content may be decided as causing the vehicle to stop after moving to the general road. In addition, if the current position of the vehicle to be controlled is a point where traffic volume and the number of pedestrians are low, the control content may be decided as causing the vehicle to stop, and if the traffic volume and the number of pedestrians are high, the control content may be decided as causing the vehicle to stop after moving to a point where the traffic volume the number of pedestrians are low. As described above, the control content decision unit 13 may decide the control content according to the road environment of the position where the vehicle is currently positioned (the general road or the highway), the traffic volume and the number of pedestrians. The control content decision unit 13 may decide the control content according to the road environment of the position where the vehicle to be controlled is currently positioned, the traffic volume, and the number of pedestrians.

In addition, the control content may be decided as causing the vehicle to travel at a low speed (for example, approximately, 10 km/h), and to follow a police vehicle when the police vehicle arrives, in association with the predetermined person. In this case, the control content decision unit 13 may decide to cause the vehicle to travel at a low speed (for example, approximately, 10 km/h) and to follow a police vehicle when the police vehicle arrives, as the control content of the vehicle to be controlled.

In addition, the control content decision unit 13 may decide the control content according to the driving skill and driving tendency of the person riding in the vehicle to be controlled.

In addition, an upper limit speed of the vehicle may be determined in association with the predetermined vehicle. In this case, the control content decision unit 13 may decide to cause the vehicle to move at a speed equal to or lower than the upper limit speed, as the control content of the vehicle to be controlled.

The output unit 14 outputs a control command including the control content decided by the control content decision unit 13 to the vehicle to be controlled. In addition, the output unit 14 may output a control command to switch a manual operation to an autonomous driving, to the vehicle to be controlled. In addition, the output unit 14 may output a control command to lock the door, to the vehicle to be controlled. The output unit 14 can send a control command to the vehicle to be controlled, for example, by the communication means exemplified above.

The vehicle control apparatus 40 of the vehicle to be controlled controls the own vehicle according to the control command received from the control system 10. For example, the vehicle control apparatus 40 switches the manual driving to the autonomous driving, sets the destination and route indicated by the control command, and controls the own vehicle according to the set content. In addition, the vehicle control apparatus 40 stops the own vehicle promptly in accordance with the "control command: stop", or cause to follow the police vehicle after a traveling at a low speed (for example, approximately 10 km/h).

Figure 5:
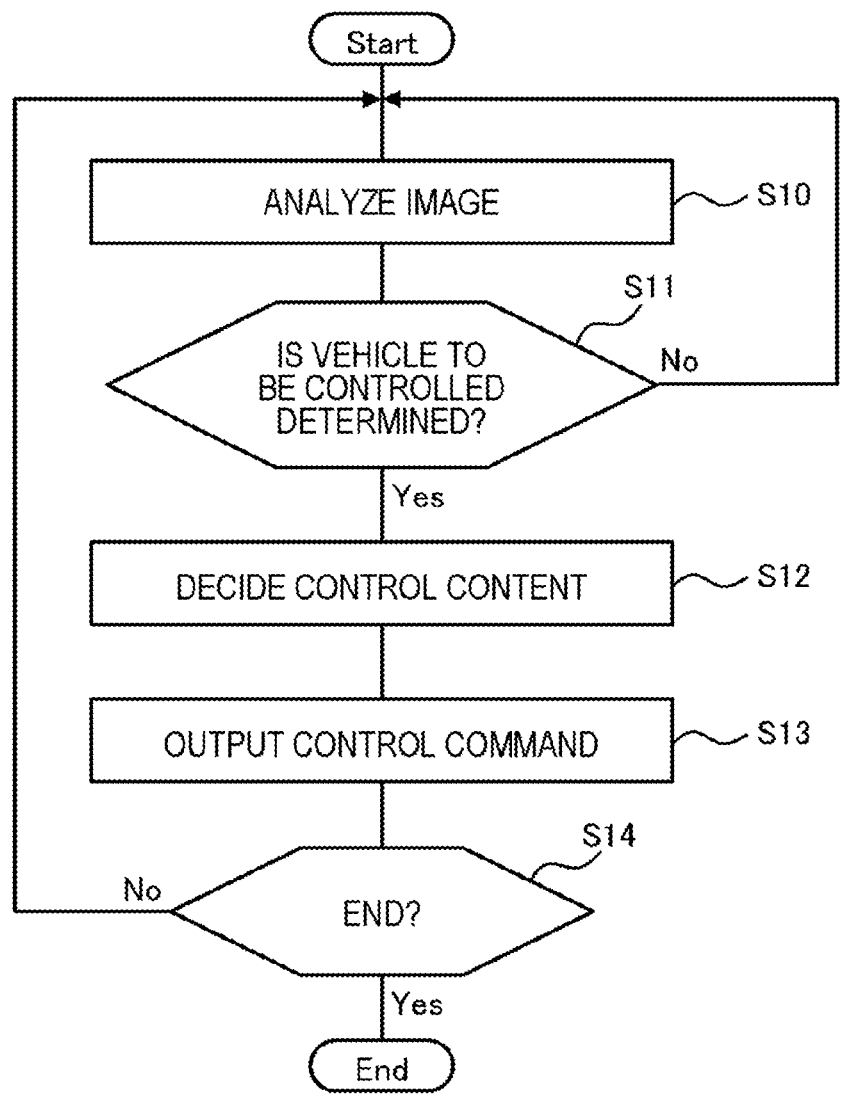
FIG. 5 is a flowchart illustrating an example of a flow of the processing performed by the control system in the present example embodiment.

Next, an example of a flow of the processing performed by the control system 10 will be described on the basis of a flowchart in FIG. 5.

First, the image acquisition unit 11 continues to acquire the images from the street camera 20 and the in-vehicle camera 30.

The controlled object determination unit 12 analyzes the image acquired by the image acquisition unit 11, and determines the vehicle in the image which matches at least one of the appearance feature value and the vehicle number of a vehicle which is pre-registered, as a vehicle to be controlled (S10).

If the vehicle to be controlled is not determined (No in S11), the process returns to S10 and the controlled object determination unit 12 analyzes another image.

If the vehicle to be controlled is determined (Yes in S11), the control content decision unit 13 decides a control content for the vehicle to be controlled (S12). The output unit 14 outputs a control command including the control content decided in S12 to the vehicle to be controlled (S13).

The processing described above is repeated unless there is an instruction to end the processing (No in S14).

According to the control system 10 in the present example embodiment described above, when a pre-registered vehicle is found on the basis of the images generated by the street camera 20 and the in-vehicle camera 30, it is possible to control the vehicle from the outside so as to perform a desired operation. The control system 10 in the present example embodiment is expected to contribute in finding and guiding of the stolen vehicle, finding and guiding of a missing person, and in solving of other events.

Second Example Embodiment

A traffic system in the present example embodiment is different from that in the first example embodiment in the processing for determining the vehicle to be controlled and the processing for deciding the control content. Other configurations are the same as those in the first example embodiment.

In the present example embodiment, the control system 10 analyzes the acquired image and determines the vehicle in which a predetermined person is riding as the vehicle to be controlled. For example, the control system 10 determines the vehicle in which a person who matches a pre-registered appearance feature value of a person is riding as the vehicle to be controlled. That is, when a pre-registered person is found on the basis of the images acquired from the street camera 20 and the in-vehicle camera 30, the control system 10 sets the vehicle in which the person is riding as the object to be controlled. The appearance feature value of a suspect, a missing person, and the like may be pre-registered.

An example of a hardware configuration of a control system 10 is the same as that of the first example embodiment.

Next, a functional configuration of the control system 10 will be described. An example of the functional block diagram of the control system 10 in the present example embodiment is similar to that in the first example embodiment, and is illustrated in FIG. 3. As illustrated, the control system 10 includes an image acquisition unit 11, a controlled object determination unit 12, a control content decision unit 13, and an output unit 14. The configuration of the image acquisition unit 11 and the output unit 14 is the same as that in the first example embodiment.

The controlled object determination unit 12 analyzes (for example, face authentication) the image acquired by the image acquisition unit 11 and determines a vehicle in which a predetermined person is riding as a vehicle to be controlled. Specifically, the controlled object determination unit 12 determines the vehicle in which a person who matches the pre-registered appearance feature value of a person is riding as the vehicle to be controlled. For example, if a person who matches the pre-registered appearance feature value of a person is determined in the image generated by the in-vehicle camera 30 that images inside the vehicle, the vehicle mounting that in-vehicle camera 30 is set as the vehicle to be controlled. In addition, if a person who matches the pre-registered appearance feature value of a person is determined in the image generated by the in-vehicle camera 30 or the street camera 20 that images outside of the vehicle, that image is further analyzed, and then, the identification information (for example, the vehicle number) of the vehicle in which the person is riding is determined. Then, the vehicle identified by the determined identification information of the vehicle is set as the vehicle to be controlled. The details of the image analysis are design matter.

The control content decision unit 13 decides the control content for the vehicle to be controlled determined by the controlled object determination unit 12.

Figure 6:
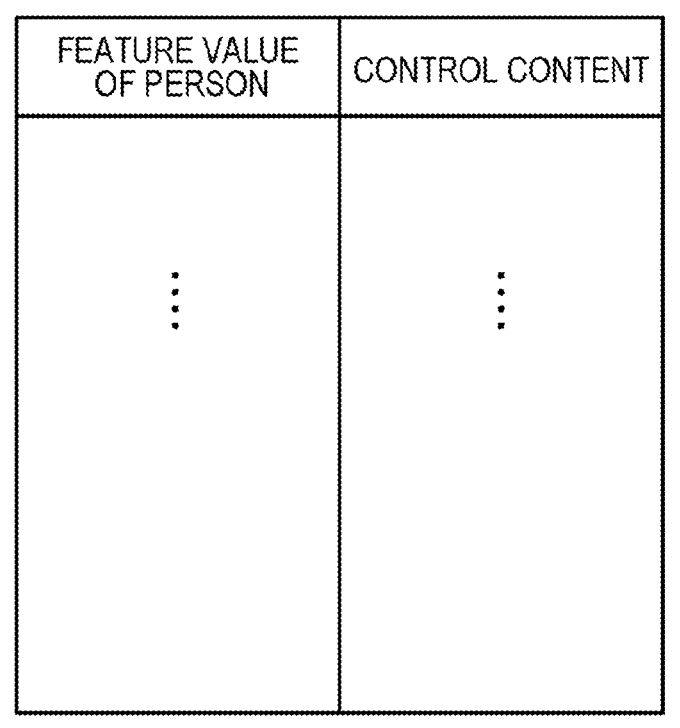

For example, as illustrated in FIG. 6, the feature value of a person may be pre-registered in association with the control content. Then, the control content decision unit 13 may decide the control content associated with the feature value of the person riding in the vehicle as the control content of the vehicle to be controlled.

For example, a destination may be registered in association with a predetermined person. Then, the control content decision unit 13 may decide the destination associated with the person as the control content of the vehicle to be controlled in which the person is riding. The registered destination may be specific one destination such as "00 police station", or may be a destination that can be selected according to the current position of the vehicle to be controlled such a "nearest police station" or "the nearest police station among the xx, ΔΔ, and yy".

In addition, selection criteria for a route to the destination may be determined in association with the predetermined person. As examples of the selection criteria, "a shortest route", "use a highway preferentially", "use a road having a less pedestrian traffic preferentially", and the like can be considered, but not limited thereto. The control content decision unit 13 may decide the route to the destination that matches the selection criteria for a route associated with the person as the control content of the vehicle to be controlled in which the person is riding. The control content decision unit 13 decides a route to the destination on the basis of the current position of the vehicle to be controlled, the destination, the selection criteria for the route, the map information, and the like. In the map information, information indicating a volume of pedestrian traffic may be registered in association with each road.

In addition, the control content may be decided as causing the vehicle in which the person is riding to stop in association with the predetermined person. In this case, the control content decision unit 13 may decide to cause the vehicle to stop as the control content of the vehicle to be controlled in which the person is riding. The control content may be decided as causing the vehicle to stop in association with the predetermined person under a certain condition. For example, when the current position of the vehicle to be controlled is a general road, the control content may be decided as causing the vehicle to stop, and when a highway, the control content may be decided as causing the vehicle to stop after moving to the general road. In addition, if the current position of the vehicle to be controlled is a point where traffic volume and the number of pedestrians are low, the control content may be decided as causing the vehicle to stop, and if the traffic volume and the number of pedestrians are high, the control content may be decided as causing the vehicle to stop after moving to a point where the traffic volume and the number of pedestrians are low. As described above, the control content decision unit 13 may decide the control content according to the road environment of the position where the vehicle is currently positioned (the general road or the highway), and the traffic volume and the number of pedestrians.

In addition, the control content may be decided as causing the vehicle in which the person is riding to travel at a low speed (for example, approximately, 10 km/h), and to follow a police vehicle when the police vehicle arrives, in association with the predetermined person. In this case, the control content decision unit 13 may decide to cause the vehicle to travel at a low speed (for example, approximately, 10 km/h) and to follow a police vehicle when the police vehicle arrives, as the control content of the vehicle to be controlled.

In addition, the control content decision unit 13 may decide the control content according to the driving skill and driving tendency of the person riding in the vehicle to be controlled.

In addition, an upper limit speed of the vehicle may be determined in association with the predetermined person. In this case, the control content decision unit 13 may decide to cause the vehicle to move at a speed equal to or lower than the upper limit speed, as the control content of the vehicle to be controlled.

Next, an example of a flow of the processing performed by the control system 10 will be described on the basis of a flowchart in FIG. 5.

First, the image acquisition unit 11 continues to acquire the images from the street camera 20 and the in-vehicle camera 30.

The controlled object determination unit 12 analyzes the image acquired by the image acquisition unit 11, and determines a vehicle in which a person who matches the pre-registered feature value of a person is riding as a vehicle to be controlled (S10).

If the vehicle to be controlled is not determined (No in S11), the process returns to S10 and the controlled object determination unit 12 analyzes another image.

If the vehicle to be controlled is determined (Yes in S11), the control content decision unit 13 decides a control content for the vehicle to be controlled (S12). The output unit 14 outputs a control command including the control content decided in S12 to the vehicle to be controlled (S13).

The processing described above is repeated unless there is an instruction to end the processing (No in S14).

According to the control system 10 in the present example embodiment described above, when a pre-registered person is found on the basis of the images generated by the street camera 20 and the in-vehicle camera 30, it is possible to control the vehicle in which the person is riding from the outside so as to perform a desired operation. The control system 10 in the present example embodiment is expected to contribute in finding and guiding of the stolen vehicle, finding and guiding of a missing person, and in solving of other events.

Third Example Embodiment

A traffic system in the present example embodiment is different from that in the first example embodiment and in the second example embodiment in the processing for determining the vehicle to be controlled and the processing for deciding the control content. Other configurations are the same as those in the first example embodiment and in the second example embodiment.

In the present example embodiment, the control system 10 analyzes the acquired image and determines the vehicle that satisfies a predetermined condition as the vehicle to be controlled. For example, the control system 10 determines the vehicle in the image that performs a pre-registered behavior pattern of a vehicle, as the vehicle to be controlled. When a vehicle that performs the pre-registered behavior pattern is found on the basis of the images acquired from the street camera 20 and the in-vehicle camera 30, the control system 10 sets the vehicle as the object to be controlled. As the behavior pattern of a vehicle, behavior patterns violating various traffic rules (for example, signal ignoring, lane change at a lane change prohibited place, overtaking at overtaking prohibited place) may be pre-registered.

An example of a hardware configuration of a control system 10 is the same as that of the first example embodiment and the second example embodiment.

Next, a functional configuration of the control system 10 will be described. An example of the functional block diagram of the control system 10 in the present example embodiment is similar to that in the first example embodiment and the second example embodiment, and is illustrated in FIG. 3. As illustrated, the control system 10 includes an image acquisition unit 11, a controlled object determination unit 12, a control content decision unit 13, and an output unit 14. The configuration of the image acquisition unit 11 and the output unit 14 is the same as that of the first example embodiment and the second example embodiment.

The controlled object determination unit 12 analyzes the image acquired by the image acquisition unit 11 and determines the vehicle that satisfies a predetermined condition included in the image as the vehicle to be controlled. Specifically, the controlled object determination unit 12 determines the vehicle in the image that performs the pre-registered behavior pattern of a vehicle as the vehicle to be controlled. As the behavior pattern of a vehicle, behavior patterns violating various traffic rules (for example, signal ignoring, lane change at a lane change prohibited place, overtaking at overtaking prohibited place) may be pre-registered. If the vehicle that performs the pre-registered behavior pattern of a vehicle is determined in the image, the controlled object determination unit 12 further analyzes the image to determine the identification information (for example, the vehicle number) of the vehicle. Then, the vehicle identified by the determined identification information of the vehicle is set as the vehicle to be controlled. The details of the image analysis are design matter. The image is an image generated by the in-vehicle camera 30 for imaging inside of the vehicle, the in-vehicle camera 30 for imaging the outside of the vehicle, the street camera 20 and the like.

The control content decision unit 13 decides the control content for the vehicle to be controlled determined by the controlled object determination unit 12.

For example, as illustrated in FIG. 7, the behavior pattern of a vehicle may be pre-registered in association with the control content. Then, the control content decision unit 13 may decide the control content associated with the behavior pattern of a vehicle performed by the vehicle, as the control content of the vehicle to be controlled.

For example, a destination may be registered in association with a predetermined behavior pattern of a vehicle. Then, the control content decision unit 13 may decide the destination associated with the behavior pattern performed by the vehicle as the control content of the vehicle to be controlled. The registered destination may be specific one destination such as "00 police station", or may be a destination that can be selected according to the current position of the vehicle to be controlled such a "nearest police station" or "the nearest police station among the xx, ΔΔ, and yy".

In addition, selection criteria for a route to the destination may be defined in association with the predetermined behavior pattern of a vehicle. As examples of the selection criteria, "a shortest route", "use a highway preferentially", "use a road having a less pedestrian traffic preferentially", and the like can be considered, but not limited thereto. The control content decision unit 13 may decide the route to the destination that matches the selection criteria for a route associated with the behavior pattern performed by the vehicle as the control content of the vehicle to be controlled. The control content decision unit 13 decides the route to the destination on the basis of the current position of the vehicle to be controlled, the destination, the selection criteria for the route, the map information, and the like. In the map information, information indicating a volume of pedestrian traffic may be registered in association with each road.

In addition, the control content may be decided as causing the vehicle to stop in association with the predetermined behavior pattern of a vehicle. In this case, the control content decision unit 13 may decide to cause the vehicle to stop as the control content of the vehicle to be controlled. The control content may be decided as causing the vehicle to stop in association with the predetermined vehicle under a certain condition. For example, when the current position of the vehicle to be controlled is a general road, the control content may be decided as causing the vehicle to stop, and when a highway, the control content may be decided as causing the vehicle to stop after moving to the general road. In addition, if the current position of the vehicle to be controlled is a point where traffic volume and the number of pedestrians are low, the control content may be decided as causing the vehicle to stop, and if the traffic volume and the number of pedestrians are high, the control content may be decided as causing the vehicle to stop after moving to a point where the traffic volume and the number of pedestrians are low. As described above, the control content decision unit 13 may decide the control content according to the road environment of the position where the vehicle is currently positioned (the general road or the highway), the traffic volume and the number of pedestrians.

In addition, the control content may be decided as causing the vehicle to travel at a low speed (for example, approximately, 10 km/h), and to follow a police vehicle when the police vehicle arrives, in association with the predetermined behavior pattern of a vehicle. In this case, the control content decision unit 13 may decide to cause the vehicle to travel at a low speed (for example, approximately, 10 km/h) and to follow a police vehicle when the police vehicle arrives, as the control content of the vehicle to be controlled.

In addition, the control content decision unit 13 may decide the control content according to the driving skill and driving tendency of the person riding in the vehicle to be controlled.

In addition, an upper limit speed of the vehicle may be determined in association with the predetermined behavior pattern of a vehicle. In this case, the control content decision unit 13 may decide to cause the vehicle to move at a speed equal to or lower than the upper limit speed as the control content of the vehicle to be controlled.

In addition, the control content decision unit 13 may decide the control content for the vehicle to be controlled that performs various violation behavior patterns, according to a degree of violation, the number of past violations, an elapsed time from the previous violation, and the like.

For example, the controlled object determination unit 12 may analyze the image acquired by the image acquisition unit 11 and may identify a person who is riding in the vehicle to be controlled (for example, the person riding on the driver's seat) that performed various violation behavior patterns. In addition, a history of past violations may be pre-registered in association with each person. The control content decision unit 13 may recognize the number of past violations, elapsed time from the previous violation, and the like of the person, on the basis of the history of the violation associated with the "person who is riding in the vehicle to be controlled that performed various violation behavior patterns" determined by the controlled object determination unit 12. The control content may be decided on the basis of the result of recognition. For example, as the number of violations increases or as the elapsed time from the previous violation becomes shorter, the control content may be decided stricter.

In addition, an order of degree of violation may be determined for various violations, such as "overtaking violation >lane change violation >signal ignorance". As the degree of violation becomes higher, the control content decision unit 13 may decide the control content stricter.

For example, as a stricter control content, the control content decision unit 13 may decide the control content as setting the nearest police station as the destination and causing the vehicle to move to the police station. In addition, the control content decision unit 13 may decide the control content as causing the vehicle to stop on that point. In this case, the control system 10 may further control a plurality of police vehicles and may cause those police vehicles to approach the stopped vehicle. As a lighter control content, the control content decision unit 13 may, for example, decide the control content as causing the vehicle to stop on that point. In this case, the control system 10 may further control one police vehicle to approach the stopped vehicle. In the processing for controlling the police vehicle, if there are a plurality of vehicles that the police vehicle approaches, the control system 10 may cause the vehicle for which a stricter control content is determined (for example, a vehicle in which a person having a higher degree of violation is riding, a vehicle in which a person having a greater number of violations is riding, a vehicle in which a person having a shorter elapsed time from the previous violation is riding) to preferentially approach the police vehicle.

Next, an example of the flow of the processing performed by the control system 10 will be described on the basis of the flowchart in FIG. 5.

First, the image acquisition unit 11 continues to acquire the images from the street camera 20 and the in-vehicle camera 30.

The controlled object determination unit 12 analyzes the image acquired by the image acquisition unit 11, and determines a vehicle in the image which performs the pre-registered behavior pattern, as a vehicle to be controlled (S10).

If the vehicle to be controlled is not determined (No in S11), the process returns to S10 and the controlled object determination unit 12 analyzes another image.

If the vehicle to be controlled is determined (Yes in S11), the control content decision unit 13 decides a control content for the vehicle to be controlled (S12). The control content decision unit 13 can decide the control content on the basis of the behavior pattern of a vehicle determined in S10. The output unit 14 outputs a control command including the control content decided in S12 to the vehicle to be controlled (S13).

For example, in S10, the controlled object determination unit 12 may determine the vehicle that performed the signal violation as the vehicle to be controlled. In S12, the control content decision unit 13 may decide the control content for the vehicle that performed the signal violation as causing the vehicle to stop. In S13, the output unit 14 may output a control command for stopping the vehicle to the vehicle to be controlled determined in S10.

The processing described above is repeated unless there is an instruction to end the processing (No in S14).

According to the control system 10 in the present example embodiment described above, when a vehicle that performs the pre-registered behavior pattern is found on the basis of the images generated by the street camera 20 and the in-vehicle camera 30, it is possible to control the vehicle from the outside so as to perform a desired operation. The control system 10 in the present example embodiment is expected to contribute to finding, arrest, guiding, and the like of the violation behavior.

Fourth Example Embodiment

A traffic system in the present example embodiment is different from that in the first example embodiment to the third example embodiment in the processing for determining the vehicle to be controlled and the processing for deciding the control content. Other configurations are the same as those in the first example embodiment to the third example embodiment.

In the present example embodiment, the control system 10 analyzes the acquired image and determines the vehicle in which a predetermined person is riding as the vehicle to be controlled. The control system 10 determines the vehicle in which a person who performs a pre-registered behavior pattern of a person is riding as the vehicle to be controlled. That is, when a person who performs the pre-registered behavior pattern is found on the basis of the images acquired from street camera 20 and in-vehicle camera 30, the control system 10 sets the vehicle in which the person is riding as the object to be controlled. As the behavior pattern of a person, a behavior pattern which violates various traffic rules (for example, operation of a mobile phone while driving), a behavior pattern indicating an illegal behavior (for example, a taxi robbery, an act of pushing a hostage into a vehicle, an act of removing a balaclava), a behavior pattern indicating a physical condition problem, (for example, syncope, stunning, behavior of a pregnant woman starting labor), and the like may be pre-registered.

An example of a hardware configuration of a control system 10 is the same as that of the first example embodiment to the third example embodiment.

Next, a functional configuration of the control system 10 will be described. An example of the functional block diagram of the control system 10 in the present example embodiment is similar to that in the first example embodiment to the third example embodiment, and is illustrated in FIG. 3. As illustrated, the control system 10 includes an image acquisition unit 11, a controlled object determination unit 12, a control content decision unit 13, and an output unit 14. The configuration of the image acquisition unit 11 and the output unit 14 is the same as that in the first example embodiment to the third example embodiment.

The controlled object determination unit 12 analyzes the image acquired by the image acquisition unit 11 and determines a vehicle in which a predetermined person is riding as a vehicle to be controlled. Specifically, the controlled object determination unit 12 determines the vehicle in which a person who performs the pre-registered behavior pattern of a person is riding as the vehicle to be controlled. As the behavior pattern of a person, the behavior pattern which violates various traffic rules (for example, operation of a mobile phone while driving), the behavior pattern indicating an illegal behavior (for example, a taxi robbery, an act of pushing a hostage into a vehicle, an act of removing a balaclava), the behavior pattern indicating a physical condition problem, (for example, syncope, stunning, behavior of a pregnant woman starting labor), and the like may be pre-registered. For example, if a person who performs the pre-registered behavior pattern of a person is determined in the image generated by the in-vehicle camera 30 that images inside the vehicle, the vehicle mounting that in-vehicle camera 30 is set as the vehicle to be controlled. In addition, if a person who performs the pre-registered behavior pattern of a person is determined in the image generated by the in-vehicle camera 30 or the street camera 20 that images outside of the vehicle, that image is further analyzed, and then, the identification information (for example, the vehicle number) of the vehicle in which the person is riding is determined. Then, the vehicle identified by the determined identification information of the vehicle is set as the vehicle to be controlled. The details of the image analysis are design matter.

The control content decision unit 13 decides the control content for the vehicle to be controlled determined by the controlled object determination unit 12.

For example, as illustrated in FIG. 8, the behavior pattern of a person may be pre-registered in association with the control content. Then, the control content decision unit 13 may decide the control content associated with the behavior pattern of a person performed by the person riding in the vehicle as the control content of the vehicle to be controlled.

For example, a destination may be registered in association with a predetermined behavior pattern of a person. Then, the control content decision unit 13 may decide the destination associated with the behavior pattern performed by the person riding in the vehicle, as the control content of the vehicle to be controlled. The registered destination may be specific one destination such as "○○ police station" or "○○ hospital", or may be a destination that can be selected according to the current position of the vehicle to be controlled such a "nearest police station", a "nearest hospital" or "the nearest police station or hospital among the xx, ΔΔ, and yy".

In addition, selection criteria for a route to the destination may be determined in association with the predetermined behavior pattern of a person. As examples of the selection criteria, "a shortest route", "use a highway preferentially", "use a road having a less pedestrian traffic preferentially", and the like can be considered, but not limited thereto. The control content decision unit 13 may decide the route to the destination that matches the selection criteria for a route associated with the behavior pattern performed by the person riding in the vehicle, as the control content of the vehicle to be controlled. The control content decision unit 13 decides the route to the destination on the basis of the current position of the vehicle to be controlled, the destination, the selection criteria for a route, the map information and the like. In the map information, information indicating a volume of pedestrian traffic may be registered in association with each road.

In addition, the control content may be decided as causing the vehicle in which the person is riding to stop in association with the predetermined behavior pattern of a person. In this case, the control content decision unit 13 may decide to cause the vehicle to stop as the control content of the vehicle to be controlled. The control content may be decided as causing the vehicle to stop in association with the predetermined person under a certain condition. For example, when the current position of the vehicle to be controlled is a general road, the control content may be decided as causing the vehicle to stop, and when a highway, the control content may be decided as causing the vehicle to stop after moving to the general road. In addition, if the current position of the vehicle to be controlled is a point where the traffic volume and the number of pedestrians are low, the control content may be decided as causing the vehicle to stop, and if the traffic volume and the number of pedestrians are high, the control content may be decided as causing the vehicle to stop after moving to a point where the traffic volume and the number of pedestrians are low. As described above, the control content decision unit 13 may decide the control content according to the road environment of the position where the vehicle is currently positioned (the general road or the highway), and the traffic volume and the number of pedestrians.

In addition, the control content may be decided as causing the vehicle in which the person is riding to travel at a low speed (for example, approximately, 10 km/h), and to follow a police vehicle when the police vehicle arrives, in association with the predetermined behavior pattern of a person. In this case, the control content decision unit 13 may decide to cause the vehicle to travel at a low speed (for example, approximately, 10 km/h) and to follow a police vehicle when the police vehicle arrives, as the control content of the vehicle to be controlled.

In addition, the control content decision unit 13 may decide the control content according to the driving skill and driving tendency of the person riding in the vehicle to be controlled.

In addition, an upper limit speed of the vehicle may be determined in association with the predetermined behavior pattern of a person. In this case, the control content decision unit 13 may decide to cause the vehicle to move at a speed equal to or lower than the upper limit speed, as the control content of the vehicle to be controlled.

In addition, the control content decision unit 13 may decide the control content for the vehicle to be controlled in which a person who performed various behavior patterns such as a violation behavior and an illegal behavior is riding, according to a degree of problematic behavior, the number of past problematic behavior, an elapsed time from the previous problematic behavior, and the like.

For example, a history of past problematic behavior may be pre-registered in association with each person. The control content decision unit 13 may recognize the number of past problematic behavior, the elapsed time from the previous problematic behavior, and the like of the person on the basis of the history of the above-described problematic behavior associated with a person who performed various behavior patterns such as the violation behavior and the illegal behavior. The control content may be decided on the basis of the result of recognition. For example, as the number of problematic behavior increases or as the elapsed time from the previous problematic behavior becomes shorter, the control content may be decided stricter.

In addition, an order of degree of problem may be determined for various problematic behaviors, such as "an act of pushing a hostage into the vehicle >a taxi robbery >an operation of a mobile phone while driving". As the degree of problem becomes higher, the control content decision unit 13 may decide the control content stricter.

For example, as a stricter control content, the control content decision unit 13 may decide the control content as setting the nearest police station as the destination and causing the vehicle to move to the police station. In addition, the control content decision unit 13 may decide the control content as causing the vehicle to stop on that point. In this case, the control system 10 may further control a plurality of police vehicles and may cause those police vehicles to approach the stopped vehicle. As a lighter control content, the control content decision unit 13 may, for example, decide the control content as causing the vehicle to stop on that point. In this case, the control system 10 may further control one police vehicle to approach the stopped vehicle. In the processing for controlling the police vehicle, if there are a plurality of vehicles that the police vehicle approaches, the control system 10 may cause the vehicle for which a stricter control content is determined (for example, a vehicle in which a person having a higher degree of violation is riding, a vehicle in which a person having a greater number of violations is riding, a vehicle in which a person having a shorter elapsed time from the previous violation is riding) to preferentially approach the police vehicle.

Next, an example of the flow of the processing performed by the control system 10 will be described on the basis of the flowchart in FIG. 5.

First, the image acquisition unit 11 continues to acquire the images from the street camera 20 and the in-vehicle camera 30.

The controlled object determination unit 12 analyzes the image acquired by the image acquisition unit 11, and determines the vehicle in which a person who performed the pre-registered behavior pattern is riding as the vehicle to be controlled (S10).

If the vehicle to be controlled is not determined (No in S11), the process returns to S10 and the controlled object determination unit 12 analyzes another image.

If the vehicle to be controlled is determined (Yes in S11), the control content decision unit 13 decides a control content for the vehicle to be controlled (S12). The control content decision unit 13 can decide the control content on the basis of the behavior pattern of a person determined in S10. The output unit 14 outputs a control command including the control content decided in S12 to the vehicle to be controlled (S13).

The processing described above is repeated unless there is an instruction to end the processing (No in S14).

According to the control system 10 in the present example embodiment described above, when a person that performs the pre-registered behavior pattern is found on the basis of the images generated by the street camera 20 and the in-vehicle camera 30, it is possible to control the vehicle in which the person is riding from the outside so as to perform a desired operation. The control system 10 in the present example embodiment is expected to contribute in finding, guiding of the violation behaviors, prevention of a vehicle accident, and a relief of a person having poor physical conditions.

Fifth Example Embodiment

A traffic system in the present example embodiment is different from that in the first example embodiment to the fourth example embodiment in the processing for determining the vehicle to be controlled and the processing for deciding the control content. Other configurations are the same as those in the first example embodiment to the fourth example embodiment.

In the present example embodiment, the control system 10 analyzes the acquired image and determines the vehicle in which a predetermined person is riding as the vehicle to be controlled. For example, the control system 10 determines a vehicle in which a person having a poor physical condition is riding as a vehicle to be controlled. That is, when a person having a poor physical condition is found on the basis of the images acquired from street camera 20 and in-vehicle camera 30, the control system 10 sets the vehicle in which the person is riding as the object to be controlled.

An example of a hardware configuration of a control system 10 is the same as that of the first example embodiment to the fourth example embodiment.

Next, a functional configuration of the control system 10 will be described. An example of the functional block diagram of the control system 10 in the present example embodiment is similar to that in the first example embodiment to the fourth example embodiment, and is illustrated in FIG. 3. As illustrated, the control system 10 includes an image acquisition unit 11, a controlled object determination unit 12, a control content decision unit 13, and an output unit 14. The configuration of the image acquisition unit 11 and the output unit 14 is the same as that in the first example embodiment to the fourth example embodiment.

The controlled object determination unit 12 analyzes the image acquired by the image acquisition unit 11 and determines a vehicle in which a predetermined person is riding as a vehicle to be controlled. Specifically, the controlled object determination unit 12 determines a vehicle in which a person having a poor physical condition is riding as the vehicle to be controlled. For example, the controlled object determination unit 12 determines the vehicle in which a person who performed a pre-registered behavior pattern of a person having a poor physical condition is riding as the vehicle to be controlled. For example, if a person who performed a pre-registered behavior pattern of a person having a poor physical condition is determined in the image generated by the in-vehicle camera 30 that images inside the vehicle, the vehicle mounting that in-vehicle camera 30 is set as the vehicle to be controlled. In addition, if a person who performs the pre-registered behavior pattern of a person having a poor physical condition is determined in the image generated by the in-vehicle camera 30 or the street camera 20 that images outside of the vehicle, that image is further analyzed, and then, the identification information (for example, the vehicle number) of the vehicle in which the person is riding is determined. Then, the vehicle identified by the determined identification information of the vehicle is set as the vehicle to be controlled. The details of the image analysis are design matter.

The controlled object determination unit 12 may acquire biological information (for example, body temperature, blood pressure, and pulse) of a person riding in each vehicle from the system of the vehicle. The controlled object determination unit 12 may further use the biological information to determine whether or not each person included in the image has a poor physical condition.

In addition, an emergency notification button may be provided for each vehicle. When the button is pressed, such a fact may be notified to the control system 10 from the system of each vehicle by any means. Then, the controlled object determination unit 12 may determine the vehicle of which the button is pressed as the vehicle to be controlled in which a person having a poor physical condition is riding.

The control content decision unit 13 decides the control content for the vehicle to be controlled determined by the controlled object determination unit 12.

Figure 9:
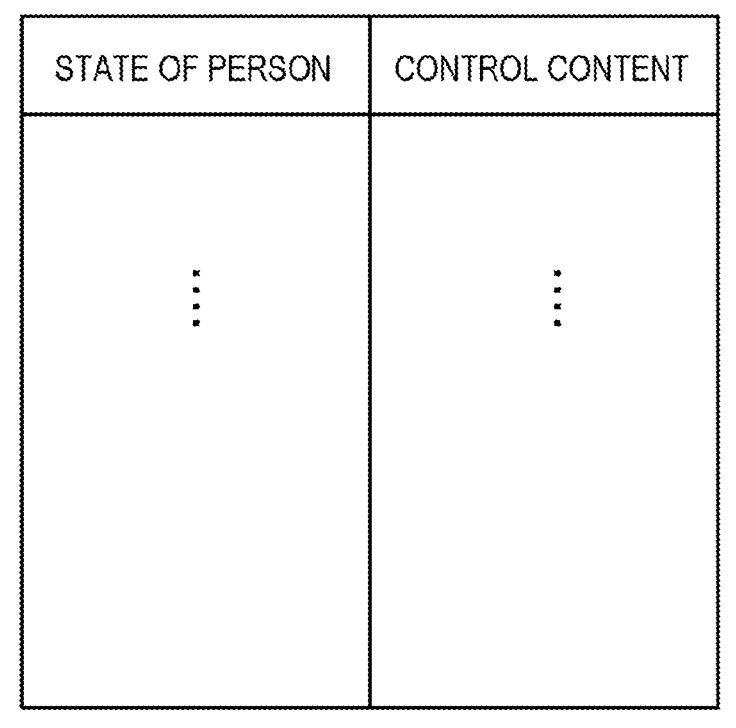

For example, as illustrated in FIG. 9, a state of a person (for example, the body temperature, the blood pressure, and the pulse) may be pre-registered in association with the control content. Then, the control content decision unit 13 may decide the control content associated with the state of the person having a poor physical condition riding in the vehicle as the control content of the vehicle to be controlled.

For example, a destination may be registered in association with a predetermined state of a person. Then, the control content decision unit 13 may decide the destination associated with the state of the person riding in the vehicle, as the control content of the vehicle to be controlled. The registered destination may be specific one destination such as "00 hospital", or may be a destination that can be selected according to the current position of the vehicle to be controlled such a "nearest hospital" or "the nearest hospital among the xx, ΔΔ, and yy".

In addition, selection criteria for a route to the destination may be determined in association with the predetermined state of a person. As examples of the selection criteria, "a shortest route", "use a highway preferentially", "use a road having a less pedestrian traffic preferentially", and the like can be considered, but not limited thereto. The control content decision unit 13 may decide the route to the destination that matches the selection criteria for a route associated with the state of the person having a poor physical condition riding in the vehicle, as the control content of the vehicle to be controlled in which the person is riding. The control content decision unit 13 decides the route to the destination on the basis of the current position of the vehicle to be controlled, the destination, the selection criteria for a route, the map information and the like. In the map information, information indicating a volume of pedestrian traffic may be registered in association with each road.

In addition, the control content may be decided as causing the vehicle in which the person is riding to stop in association with the predetermined state of a person. In this case, the control content decision unit 13 may decide to cause the vehicle to stop as the control content of the vehicle to be controlled. The control content may be decided as causing the vehicle to stop in association with the predetermined state of a person under a certain condition. For example, when the current position of the vehicle to be controlled is a general road, the control content may be decided as causing the vehicle to stop, and when the highway, the control content may be decided as causing the vehicle to stop after moving to the general road. In addition, if the current position of the vehicle to be controlled is a point where the traffic volume and the number of pedestrians are low, the control content may be decided as causing the vehicle to stop, and if the traffic volume and the number of pedestrians are high, the control content may be decided as causing the vehicle to stop after moving to a point where the traffic volume and the number of pedestrians are low. As described above, the control content decision unit 13 may decide the control content according to the road environment of the position where the vehicle is currently positioned (the general road or the highway), and the traffic volume and the number of pedestrians.

In addition, the control content decision unit 13 may decide the control content according to the driving skill and driving tendency of the person riding in the vehicle to be controlled.

In addition, an upper limit speed of the vehicle may be determined in association with the predetermined state of a person. For example, as the degree of urgency is higher, the upper limit speed may be determined higher. In this case, the control content decision unit 13 may decide to cause the vehicle to move at a speed equal to or lower than the upper limit speed, as the control content of the vehicle to be controlled.

In addition, the control content decision unit 13 may decide the control content according to a degree of state of a person (a degree of severity). For example, the control content decision unit 13 may decide the control content as setting a nearest hospital having a critical emergency care as a destination and causing the vehicle to move to the hospital, as the control content for the vehicle to be controlled in which a person with a higher degree of severity is riding. In addition, the control content decision unit 13 may decide the control content as setting a nearest hospital as the destination and causing the vehicle to move to the hospital, as the control content for the vehicle to be controlled in which a person with a low degree of severity is riding. If a plurality of persons having poor physical conditions of which the degree of severity are different from each other are riding in the vehicle to be controlled, the control content decision unit 13 may decide the control content on the basis of the degree of severity of the person having the highest degree of severity.

Next, an example of the flow of the processing performed by the control system 10 will be described on the basis of the flowchart in FIG. 5.

First, the image acquisition unit 11 continues to acquire the images from the street camera 20 and the in-vehicle camera 30.

The controlled object determination unit 12 analyzes the image acquired by the image acquisition unit 11, and determines the vehicle in which a person having a poor physical condition is riding as the vehicle to be controlled (S10).

If the vehicle to be controlled is not determined (No in S11), the process returns to S10 and the controlled object determination unit 12 analyzes another image.

If the vehicle to be controlled is determined (Yes in S11), the control content decision unit 13 decides a control content for the vehicle to be controlled (S12). The output unit 14 outputs a control command including the control content decided in S12 to the vehicle to be controlled (S13).

The processing described above is repeated unless there is an instruction to end the processing (No in S14).

According to the control system 10 in the present example embodiment described above, when a person having a poor physical condition is found on the basis of the images generated by the street camera 20 and the in-vehicle camera 30, it is possible to control the vehicle in which the person is riding from the outside so as to perform a desired operation. The control system 10 in the present example embodiment is expected to contribute to a relief of a person having a poor physical condition.

Sixth Example Embodiment

A control system 10 in the present example embodiment can perform equal to or more than two processing items among the "processing for determining the vehicle to be controlled and processing for deciding the control content" corresponding to each of the first to fifth example embodiments. According to the control system 10 in the present example embodiment, it is possible to achieve the same operation effects as those of the first to fifth example embodiments.

Modification Example

Modification examples applicable to the first to sixth example embodiments will be described.

When the destination of the vehicle to be controlled is determined and the control command is output, the control system 10 may notify the destination of a fact that the vehicle is headed to the destination. An e-mail or the like is exemplified as the notifying means, but the present invention is not limited thereto. The content of the notification may include information on the vehicle to be controlled, information on a person riding in the vehicle to be controlled, a current position of the vehicle to be controlled, an estimated time of arrival at the destination, and the like.

In addition, the control system 10 may set a vehicle positioned around the vehicle to be controlled (hereinafter, referred to as a first vehicle to be controlled) determined by the methods described in the first to sixth example embodiments (for example, a vehicle within a predetermined distance from the first vehicle to be controlled) as another vehicle to be controlled (hereinafter, referred to as a second vehicle to be controlled). In this case, the control system 10 may control the second vehicle to be controlled such that the first vehicle to be controlled can move preferentially. For example, the control system 10 may control the second vehicle to be controlled to open the road for the first vehicle to be controlled.

Modification examples of the third and fifth example embodiments will be described. When a vehicle or a person who performed the pre-registered "behavior pattern of a vehicle or a person" is detected, the detected vehicle or person may be determined by collating with the vehicle or person registered in DB (database) or the like. The control contents may be pre-registered in the DB or the like corresponding to the vehicle or the person. Then, the control content corresponding to the determined vehicle or person may be determined. In this case, instead of collating all the imaged vehicles and persons, the vehicle or person is collated and determined using a case where the vehicle or the person performs a specific behavior pattern as a trigger, and then, the control content corresponding to the vehicle or person is determined. As a result thereof, the processing load of the computer can be reduced.

For example, the controlled object determination unit 12 may detect a vehicle that commits a traffic signal violation as the vehicle that performs the specific behavior pattern on the basis of the image. The controlled object determination unit 12 may collate the detected vehicle or the person riding in the vehicle with a DB in which a person or vehicle of frequent violations is registered. Then, in a case of matching, the controlled object determination unit 12 may use the vehicle as the vehicle to be controlled. In addition, the control content may be pre-registered in the DB in association with the person or vehicle of frequent violations. The higher the level of frequency, the control content may be registered as stricter. For example, for an object to be controlled with a high level of frequency, causing the vehicle to move to a police station may be registered. The control content decision unit 13 can decide the control content on the basis of the DB.

Application Example

Next, an example applying the control systems 10 in the first to sixth example embodiments will be described.

Application Example 1

In an application example 1, the feature value of an appearance of a wanted criminal may be pre-registered. In addition, in association with the pre-registered feature value, the destination may be set as "a nearest police station", and the control content in which the selection criteria for a route to the destination is "use a road having a less pedestrian traffic preferentially", or the like may be registered.

The control system 10 analyzes the images acquired from the street camera 20 and the in-vehicle camera 30, and when a person who matches the feature value of the person is determined in the image, the vehicle in which the person is riding is set as the vehicle to be controlled. Then, the control system 10 determines the nearest police station as the destination of the vehicle to be controlled. In addition, the control system 10 determines the route to the destination on the basis of the current position of the vehicle to be controlled, the destination, the selection criteria for the route, the map information, and the like.

The control system 10 transmits a control command including the decided control content to the vehicle to be controlled. In addition, the control system 10 may notify the destination of a fact that the vehicle is headed to the destination through the email.

Application Example 2

In an application example 2, when an incident such as a bank robbery occurs, the appearance feature value of the criminal's and the behavior pattern considered to be performed by the criminal (for example, behaviors such as pushing the hostage into the vehicle, pulling the hostages out from the vehicle, removing the balaclava) are registered. In addition, in association with this, a control content and the like are set in which the destination is set to the "nearest police station" and the selection criteria for a route to the destination is set to "use a road having a less pedestrian traffic preferentially".

The control system 10 analyzes the images acquired from the street camera 20 and the in-vehicle camera 30, and, when a person who matches the feature value of the person or a person who performed the behavior that matches the behavior pattern of the person is determined, the control system sets the vehicle in which the person is riding as the vehicle to be controlled. The control system 10 determines the nearest police station as the destination of the vehicle to be controlled. The control system 10 also determines a route to the destination on the basis of the current position of the vehicle to be controlled, the destination, the selection criteria for the route, the map information, and the like.

Then, the control system 10 transmits the control command including the decided control content to the vehicle to be controlled. In addition, the control system 10 may notify the destination of the fact that the vehicle is heading to destination by email or the like.

Application Example 3

In an application example 3, when a person having a poor physical condition is determined on the basis of the images acquired from the street camera 20 and the in-vehicle camera 30, and the biological information, and the like, the control system 10 sets the vehicle in which the person is riding as the vehicle to be controlled. The control system 10 determines the nearest hospital as the destination of the vehicle to be controlled. In addition, the control system 10 also determines a route to the destination on the basis of the current position of the vehicle to be controlled, the destination, the selection criteria for the route, the map information, and the like. In addition, the control system 10 determines an upper limit speed according to the state of the person having a poor physical condition.

The control system 10 transmits the control command including the decided control content to the vehicle to be controlled. In addition, the control system 10 may notify the destination of the fact that the vehicle is heading to destination by email or the like.

The control system 10 may output a control command causing the vehicle not to perform an emergency transportation immediately (transport to the hospital with setting the upper limit high) but to perform the transportation at the upper limit speed according to the traffic rule, and when the emergency transportation instruction is issued from the destination after the notification by the email as described above, then, may output the control command causing the vehicle to perform the emergency transportation in response to the instruction.

Examples of a reference example embodiments will be added as appendixes as follows.
1. A control system includes
   an image acquisition unit that acquires an image generated by a camera;
   a controlled object determination unit that analyzes the image and determines at least one of a vehicle that satisfies a predetermined condition and a vehicle in which a predetermined person is riding included in the image, as a vehicle to be controlled;
   a control content decision unit that decides a control content for the vehicle to be controlled; and
   an output unit that outputs a control command including the control content to the vehicle to be controlled.
2. The control system according to 1,
   in which the controlled object determination unit determines a vehicle in the image which matches at least one of an appearance feature value and a vehicle number of a vehicle which is pre-registered, as the vehicle to be controlled.
3. The control system according to 1 or 2,
   in which the controlled object determination unit determines a vehicle in the image which performs a pre-registered behavior pattern of a vehicle, as the vehicle to be controlled.
4. The control system according to any one of 1 to 3,
   in which the controlled object determination unit determines a vehicle in which a person who matches a pre-registered appearance feature value of a person is riding, as the vehicle to be controlled.
5. The control system according to any one of 1 to 4,
   in which the controlled object determination unit determines a vehicle in which a person who performs a pre-registered behavior pattern of a person is riding, as the vehicle to be controlled.
6. The control system according to any one of 1 to 5,
   in which the controlled object determination unit determines a vehicle in which a person having a poor physical condition is riding, as the vehicle to be controlled.
7. The control system according to any one of 1 to 6,
   in which the output unit outputs a control command for switching from manual driving to autonomous driving to the vehicle to be controlled.
8. The control system according to any one of 1 to 7,
   in which at least one of an appearance feature value and a vehicle number of a vehicle is pre-registered in association with the control content,
   in which the controlled object determination unit determines a vehicle in the image which matches at least one of the appearance feature value and the vehicle number of a vehicle which is pre-registered, as the vehicle to be controlled, and
   in which the control content decision unit decides a control content associated with at least one of the appearance feature value and the vehicle number of the vehicle, as the control content of the vehicle to be controlled.
9. The control system according to any one of 1 to 8,
   in which a behavior pattern of a vehicle is pre-registered in association with the control content,
   in which the controlled object determination unit determines a vehicle in the image which performs the pre-registered behavior pattern of a vehicle, as the vehicle to be controlled, and
   in which the control content decision unit decides a control content associated with the behavior pattern performed by the vehicle, as the control content of the vehicle to be controlled.
10. The control system according to any one of 1 to 9,
    in which an appearance feature value of a person is pre-registered in association with the control content,
    in which the controlled object determination unit determines a vehicle in which a person who matches the pre-registered appearance feature value of a person is riding, as the vehicle to be controlled, and
    in which the control content decision unit decides a control content associated with the appearance feature value of the person riding in the vehicle, as the control content of the vehicle to be controlled.
11. The control system according to any one of 1 to 10,
    in which a behavior pattern of a person is pre-registered in association with the control content,
    in which the controlled object determination unit determines a vehicle in which a person who performs the pre-registered behavior pattern of a person is riding, as the vehicle to be controlled, and in which the control content decision unit decides a control content associated with the behavior pattern performed by the person riding in the vehicle, as the control content of the vehicle to be controlled.

12. The control system according to any one of 1 to 11, in which the control content decision unit decides at least one of a destination, a route to the destination, and an upper limit speed of the vehicle to be controlled.

13. The control system according to any one of 1 to 12, in which the control content decision unit decides to cause the vehicle to be controlled to stop.

14. The control system according to any one of 1 to 7, in which the controlled object determination unit determines a vehicle in which a person who performs a pre-registered behavior pattern of a person is riding, or a vehicle in the image which performs a pre-registered behavior pattern of a vehicle, as the vehicle to be controlled, and in which the control content decision unit decides a control content associated with the vehicle, as the control content of the vehicle to be controlled.

15. The control system according to any one of 1 to 14, in which the control content decision unit decides a control content according to a current position of the vehicle to be controlled.

16. The control system according to 15, in which the control content decision unit decides the control content according to a road environment of a position where the vehicle to be controlled is currently positioned, a traffic volume, or the number of pedestrians.

17. The control system according to any one of 1 to 16, in which the image acquisition unit acquires the image from at least one of an in-vehicle camera installed in the vehicle and a street camera installed over a road.

18. A control method executed by a computer, the method including:

an image acquisition step of acquiring an image generated by a camera;

a controlled object determination step of analyzing the image and determining at least one of a vehicle that satisfies a predetermined condition and a vehicle in which a predetermined person is riding included in the image, as a vehicle to be controlled;

a control content decision step of deciding a control content for the vehicle to be controlled; and an output step of outputting a control command including the control content to the vehicle to be controlled.

19. A program causing a computer to function as:

an image acquisition unit that acquires an image generated by a camera;

a controlled object determination unit that analyzes the image and determines at least one of a vehicle that satisfies a predetermined condition and a vehicle in which a predetermined person is riding included in the image, as a vehicle to be controlled;

a control content decision unit that decides a control content for the vehicle to be controlled; and an output unit that outputs a control command including the control content to the vehicle to be controlled.

This application claims priority based on Japanese Patent Application No. 2017-014503 filed on Jan. 30, 2017, the disclosure of which is incorporated herein in its entirety.

The invention claimed is:

1. A control system comprising:
at least one memory configured to store one or more instructions; and
at least one processor configured to execute the one or more instructions to:
acquire an image generated by a camera;
analyze the image and determine a vehicle to be controlled in the image which performs a pre-registered behavior pattern;
decide a control content for the vehicle to be controlled; and
output a control command including the control content to the vehicle to be controlled;
wherein the pre-registered behavior pattern of the vehicle is signal ignoring, lane change at a lane change prohibited place, or overtaking at an overtaking prohibited place;
wherein the processor is further configured to execute the one or more instructions to decide the control content according to a traffic rule violated by the vehicle.

2. The control system according to claim 1, wherein the processor is further configured to execute the one or more instructions to determine that the vehicle to be controlled in the image matches at least one of an appearance feature value and a pre-registered vehicle number.

3. The control system according to claim 1, wherein the processor is further configured to execute the one or more instructions to determine a person who matches a pre-registered appearance feature value is riding in the vehicle to be controlled.

4. The control system according to claim 1, wherein the processor is further configured to execute the one or more instructions to determine that a person who performs a pre-registered behavior pattern is riding in the vehicle to be controlled.

5. The control system according to claim 1, wherein the processor is further configured to execute the one or more instructions to determine that a person having a poor physical condition is riding in the vehicle to be controlled.

6. The control system according to claim 1, wherein the processor is further configured to execute the one or more instructions to output a control command for switching from manual driving to autonomous driving to the vehicle to be controlled.

7. The control system according to claim 1, wherein at least one of an appearance feature value and a vehicle number of a vehicle is pre-registered in association with the control content,
wherein the processor is further configured to execute the one or more instructions to:
determine that the vehicle to be controlled in the image matches at least one of the appearance feature value and the vehicle number, and
decide the control content associated with at least one of the appearance feature value and the vehicle number.

8. The control system according to claim 1, wherein a behavior pattern of the vehicle to be controlled is pre-registered in association with the control content,
wherein the processor is further configured to execute the one or more instructions to:
determine that the vehicle in the image is to be controlled based on the vehicle performing the pre-registered behavior pattern, and decide the control content associated with the behavior pattern performed by the vehicle.

9. The control system according to claim 1,
wherein an appearance feature value of a person is pre-registered in association with the control content,
wherein the processor is further configured to execute the one or more instructions to:
determine that the vehicle to be controlled has a person riding in the vehicle who matches the pre-registered appearance feature value, and
decide the control content associated with the appearance feature value of the person riding in the vehicle.

10. The control system according to claim 1,
wherein a behavior pattern of a person is pre-registered in association with the control content,
wherein the processor is further configured to execute the one or more instructions to:
determine that the vehicle to be controlled has a person riding in the vehicle who performs the pre-registered behavior pattern, and
decide the control content associated with the behavior pattern performed by the person riding in the vehicle.

11. The control system according to claim 1,
wherein the processor is further configured to execute the one or more instructions to decide at least one of a destination, a route to the destination, and an upper limit speed of the vehicle to be controlled.

12. The control system according to claim 1,
wherein the processor is further configured to execute the one or more instructions to decide to cause the vehicle to be controlled to stop.

13. The control system according to claim 1,
wherein the processor is further configured to execute the one or more instructions to:
determine that the vehicle to be controlled has a person riding in the vehicle who performs a pre-registered behavior pattern, or that the vehicle in the image performs a pre-registered behavior pattern, and
decide the control content associated with the vehicle, as the control content of the vehicle to be controlled.

14. The control system according to claim 1,
wherein the processor is further configured to execute the one or more instructions to decide the control content according to a current position of the vehicle to be controlled.

15. The control system according to claim 14,
wherein the processor is further configured to execute the one or more instructions to decide the control content according to a road environment of a position where the vehicle to be controlled is currently positioned, a traffic volume, or the number of pedestrians.

16. The control system according to claim 1,
wherein the processor is further configured to execute the one or more instructions to the image from at least one of an in-vehicle camera installed in the vehicle and a street camera installed over a road.

17. A control method executed by a computer, the method comprising:
acquiring an image generated by a camera;
analyzing the image and determining a vehicle to be controlled in the image which performs a pre-registered behavior pattern;
deciding a control content for the vehicle to be controlled; and
outputting a control command including the control content to the vehicle to be controlled;
wherein the pre-registered behavior pattern of the vehicle is signal ignoring, lane change at a lane change prohibited place, or overtaking at an overtaking prohibited place
wherein the method further comprises deciding the control content according to a traffic rule violated by the vehicle.

18. A non-transitory storage medium storing a program causing a computer to:
acquire an image generated by a camera;
analyze the image and determine a vehicle to be controlled in the image which performs a pre-registered behavior pattern;
decide a control content for the vehicle to be controlled; and
output a control command including the control content to the vehicle to be controlled;
wherein the pre-registered behavior pattern of the vehicle is signal ignoring, lane change at a lane change prohibited place, or overtaking at an overtaking prohibited place;
wherein the non-transitory storage medium storing the program further causes the computer to decide the control content according to a traffic rule violated by the vehicle.

19. The control system according to claim 1,
wherein the pre-registered behavior pattern of the vehicle is a behavior pattern violating various traffic rules.

* * * * *